US011052718B2

United States Patent
Lee et al.

(10) Patent No.: US 11,052,718 B2
(45) Date of Patent: Jul. 6, 2021

(54) ACTIVE SUSPENSION CONTROL UNIT AND METHOD

(71) Applicants: Hyundai Motor Company, Seoul (KR); Kia Motors Corporation, Seoul (KR)

(72) Inventors: Hui Kwon Lee, Anyang-si (KR); Woo Kyun Kim, Seoul (KR); Min Su Lee, Seongnam-si (KR)

(73) Assignees: Hyundai Motors Company, Seoul (KR); Kia Corporation, Seoul (KR)

( * ) Notice: Subject to any disclaimer, the term of this patent is extended or adjusted under 35 U.S.C. 154(b) by 77 days.

(21) Appl. No.: 16/414,528

(22) Filed: May 16, 2019

(65) Prior Publication Data
US 2020/0180381 A1    Jun. 11, 2020

(30) Foreign Application Priority Data

Dec. 6, 2018 (KR) .......................... 10-2018-0156325

(51) Int. Cl.
*B60G 17/016* (2006.01)
*B60G 21/02* (2006.01)

(52) U.S. Cl.
CPC ......... *B60G 17/016* (2013.01); *B60G 21/026* (2013.01); *B60G 2204/82* (2013.01); *B60G 2400/10* (2013.01); *B60G 2400/206* (2013.01); *B60G 2800/0122* (2013.01)

(58) Field of Classification Search
CPC . B60G 17/016; B60G 21/026; B60G 2400/10
See application file for complete search history.

(56) References Cited

U.S. PATENT DOCUMENTS

| | | | |
|---|---|---|---|
| 8,116,939 B2 * | 2/2012 | Kajino | B60G 17/0157 701/38 |
| 8,428,807 B2 * | 4/2013 | Gartner | B60G 17/0165 701/29.1 |
| 8,744,681 B2 * | 6/2014 | Liu | B60G 17/015 701/38 |
| 2017/0349022 A1 | 12/2017 | Masamura | |
| 2020/0139784 A1 * | 5/2020 | Sridhar | B60G 21/08 |
| 2020/0180591 A1 * | 6/2020 | Choi | B60W 10/22 |

FOREIGN PATENT DOCUMENTS

JP        2005-255152 A       9/2005

* cited by examiner

*Primary Examiner* — Faye M Fleming
(74) *Attorney, Agent, or Firm* — Morgan, Lewis & Bockius LLP

(57) ABSTRACT

An active suspension control unit may include an actuator having an active roll stabilization (ARS) structure to variably adjust response characteristics of a suspension, and a controller for determining a driving situation of a vehicle through information input from a sensor, and determining a final desired control value of the actuator based on a desired relative suspension vertical force value set in advance according to the driving situation and a difference value generated by a difference between left and right wheel's relative suspension vertical velocities.

12 Claims, 4 Drawing Sheets

ACTIVE SUSPENSION CONTROL UNIT AND METHOD

CROSS REFERENCE TO RELATED APPLICATION

The present application claims priority of Korean Patent Application No. 10-2018-0156325 filed on Dec. 6, 2018, the entire contents of which is incorporated herein for all purposes by this reference.

BACKGROUND OF THE DISCLOSURE

Field of the Disclosure

The present invention relates to an active suspension control unit and method, and, particularly more, to an active suspension control unit and method that are applicable to an active roll stabilization (ARS) type suspension.

Description of Related Art

A conventional stabilizer bar type suspension is configured to connect the left and right wheels of a vehicle to enhance roll stiffness. When the height between the left and right wheels is changed using such a stabilizer bar, the rolling of the vehicle is suppressed, for example, during rough driving or turning.

However, since the stabilizer bar is of a fixed structure, it is necessary to set the stabilizer bar to be soft for making passengers comfortable and to set the stabilizer bar to be hard for improving driving stability. Therefore, it is necessary to adjust the stabilizer bar to have moderate stiffness by compromising both of them and to vary the stiffness of the stabilizer bar depending on the purpose of the vehicle.

Meanwhile, an active roll stabilization (ARS) type suspension may individually control the left and right wheels of the vehicle through electronic control, improving the behavior stability of the vehicle during rough driving or turning.

Since the ARS suspension is able to softly or hardly adjust roll stiffness according to the driving situation, it is possible to improve both of passenger comfort and driving stability in a response to the complex driving situation.

The control of conventional ARS has been performed by a feedback method of determining a desired relative suspension vertical force using the relative suspension vertical velocity generated according to the driving situation and determining a desired actuator control value therethrough. However, the present feedback method is problematic in that it causes a delay phenomenon in which it takes time to stabilize under the condition that the driving situation changes in real time and it does not properly handle a disturbance situation in which the height between left and right wheels is changed.

Accordingly, there is a demand for a new active suspension control unit configured for minimizing a delay and coping with a varying road condition, and a control method using the same.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an active suspension control unit and method that control an actuator by summing a first desired control value of the actuator determined through a desired relative suspension vertical force and a second desired control value of the actuator determined through a disturbance.

In accordance with one aspect of the present invention, an active suspension control unit may include an actuator having an active roll stabilization (ARS) structure to variably adjust response characteristics of a suspension, a first controller for determining a driving situation of a vehicle through information input from a sensor and outputting a desired relative suspension vertical force value set in advance according to the driving situation, and a second controller for determining a final desired control value of the actuator based on the desired relative suspension vertical force value transmitted from the first controller and a difference value generated by a difference between left and right wheel's relative suspension vertical velocities.

The second controller may receive the right wheel's desired relative suspension vertical force value from the first controller and determine the first desired control value of the actuator for the right wheel using the following Equation 1, or Equation 1-A:

$$\tau_{Gc} = G_c F_{R,d}, \qquad \text{Equation 1:}$$

$$\tau_{Gc} = G_c F_{L,d}, \qquad \text{Equation 1-A:}$$

where $\tau_{Gc}$ is a second controller's first desired control value, $G_c$ is a second controller's control function, $F_{R,d}$ is a right wheel's desired relative suspension vertical force value, and $F_{L,d}$ is a left wheel's desired relative suspension vertical force value.

The second controller may receive the right wheel's relative suspension vertical velocity and the left wheel's relative suspension vertical velocity to determine a difference value $V_R - V_L$, and determine the second desired control value of the actuator using the following Equation 2:

$$\tau_{Y2} = Y_2(V_R - V_L), \qquad \text{Equation 2:}$$

where $\tau_{Y2}$ is a second controller's second desired control value, $Y_2$ is a second controller's control function, $V_R$ is a right wheel's relative suspension vertical velocity, and $V_L$ is a left wheel's relative suspension vertical velocity.

The second controller may receive the right wheel's relative suspension vertical velocity and the left wheel's relative suspension vertical velocity from a vertical velocity estimation module.

The vertical velocity estimation module may estimate the relative suspension vertical velocities based on a difference between accelerations measured by a body acceleration sensor and a wheel acceleration sensor.

The second controller may be configured to determine the final desired control value by summing the first desired control value of the actuator determined based on the desired relative suspension vertical force value and the second desired control value of the actuator determined based on the difference value $V_R - V_L$.

In accordance with another aspect of the present invention, an active suspension control method may include determining a desired relative suspension vertical force value according to a driving situation, determining a difference value by estimating a right wheel's relative suspension vertical velocity and a left wheel's relative suspension vertical velocity, determining a final desired control value of an actuator by determining a first desired control value of the actuator based on the desired relative suspension vertical force value, determining a second desired control value of the actuator based on a difference value of the relative suspension vertical velocity of the first wheel and the relative suspension vertical velocity of the second wheel, and summing the first and second desired control values, and operating the actuator based on the determined final desired control value of the actuator.

In the determining a final desired control value of an actuator, the first desired control value of the actuator may be determined from the desired relative suspension vertical force value using the following Equation 1, and the second desired control value of the actuator may be determined from the difference value using the following Equation 2:

$$\tau_{Gc} = G_c F_{R,d}; \text{ and} \quad \text{Equation 1:}$$

$$\tau_{Y2} = Y_2(V_R - V_L), \quad \text{Equation 2:}$$

where $\tau_{Gc}$ is a second controller's first desired control value, $G_c$ is a second controller's control function, $F_{R,d}$ is a right wheel's desired relative suspension vertical force value, $\tau_{Y2}$ is a second controller's second desired control value, $Y_2$ is a second controller's control function, $V_R$ is a right wheel's relative suspension vertical velocity, and $V_L$ is a left wheel's relative suspension vertical velocity.

In the determining a desired relative suspension vertical force value, the desired relative suspension vertical force value set in advance according to the driving situation may be output.

In the determining a difference value, the difference value may be output by determining a difference between the right wheel's relative suspension vertical velocity and the left wheel's relative suspension vertical velocity.

In the determining a difference value, the right wheel's relative suspension vertical velocity and the left wheel's relative suspension vertical velocity may be estimated using a difference between a vehicle body's acceleration and the first and second wheels' acceleration.

As apparent from the above description, the active suspension control unit and method according to an exemplary embodiment of the present invention have the following effects:

First, it is possible to improve passenger comfort and driving stability in rapid response to the disturbance;

Second, it is possible to rapidly suppress the roll/yaw motion of the vehicle by minimizing the response delay;

Third, the first controller (ECU) may be independently designed with not consideration for the disturbance because the second controller responds to the disturbance; and Fourth, it is possible to increase the convenience of designing and applying the controller by simplifying the transfer function for control.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
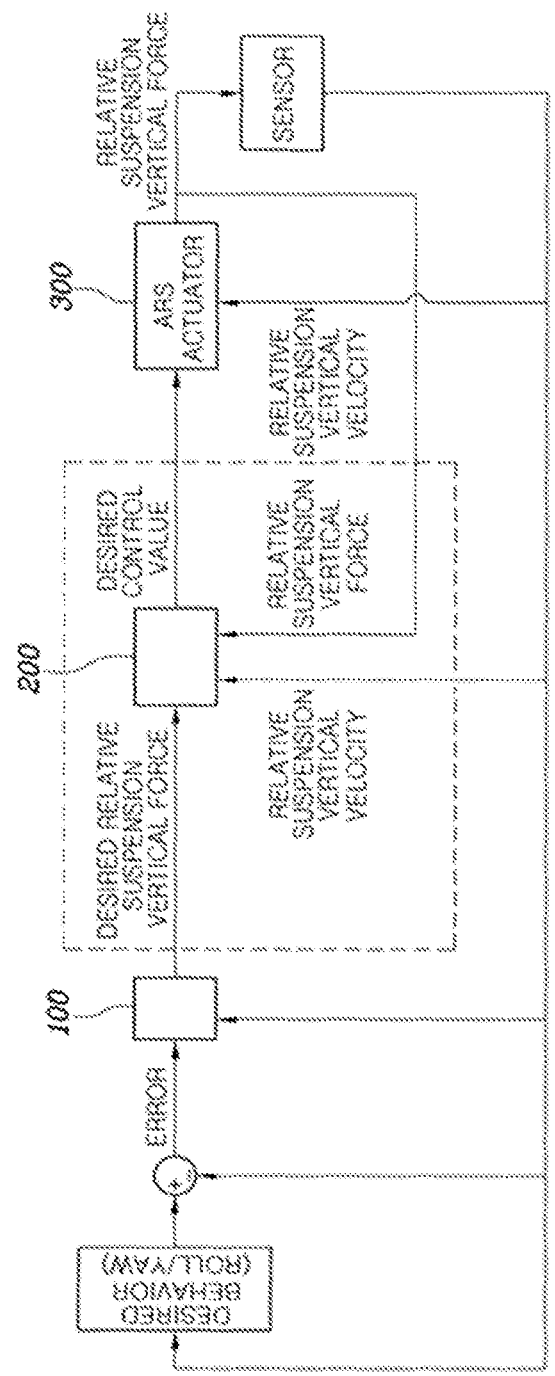
FIG. 1 is a conceptual diagram schematically illustrating an active suspension control unit according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The terminology used herein is for describing various exemplary embodiments only and is not intended to limit the disclosure. As used in an exemplary embodiment of the present invention and the appended claims, the singular forms "a", "an" and "the" are intended to include the plural forms as well, unless context clearly indicates otherwise. It will be further understood that the terms "comprises/includes" and/or "comprising/including" when used in the exemplary embodiment, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art. It will be further understood that terms, such as those defined in commonly used dictionaries, should be interpreted as having a meaning which is consistent with their meaning in the context of the relevant art and the present invention, and will not be interpreted in an idealized or overly formal sense unless expressly so defined herein.

An active suspension control unit and method according to the exemplary embodiments of the present invention will be described below with reference to the accompanying drawings.

Figure 2:
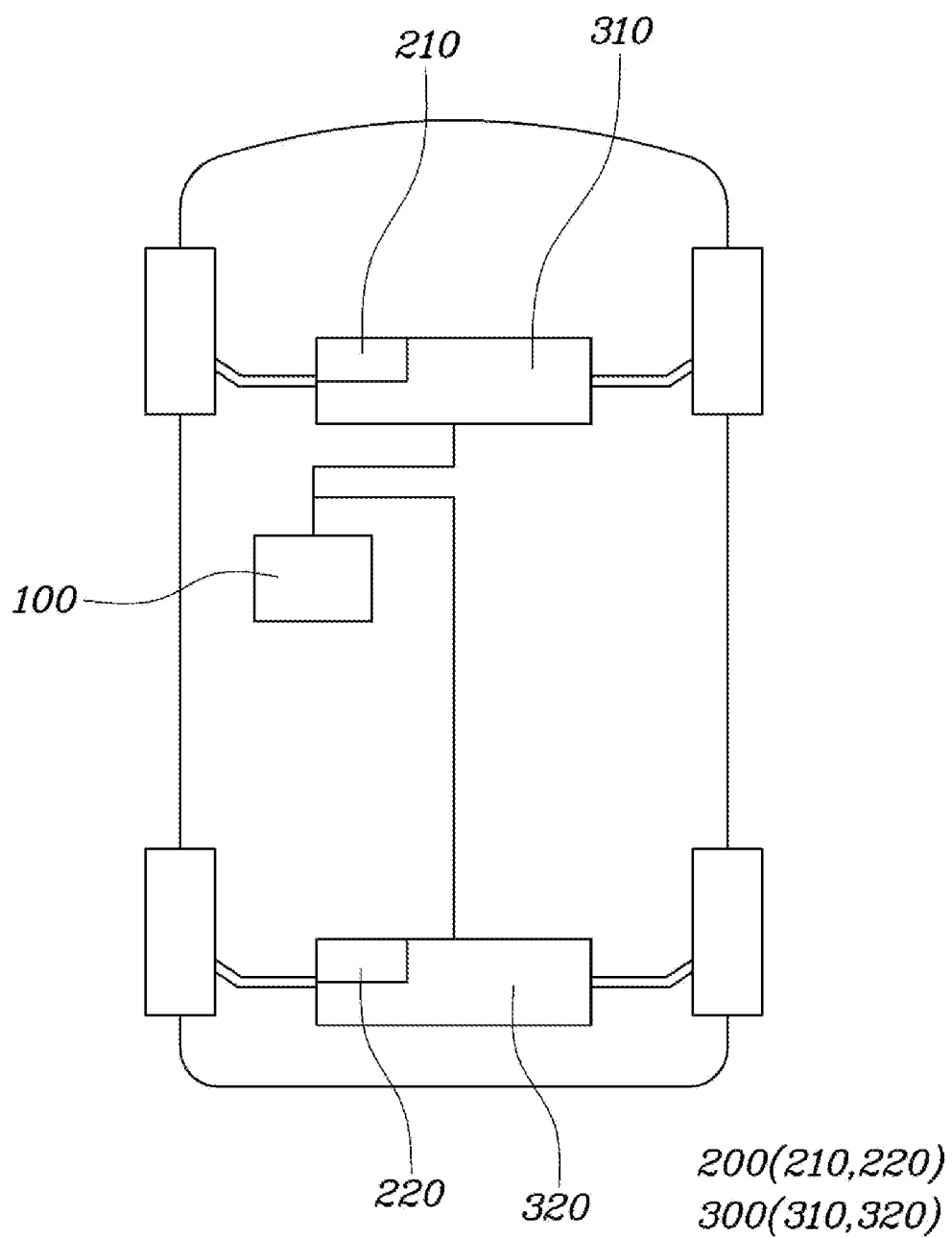
FIG. 2 is a view exemplarily illustrating a structure of the active suspension control unit according to an exemplary embodiment of the present invention.

First, an active suspension control unit will be described. FIG. 1 is a conceptual diagram schematically illustrating an active suspension control unit according to an exemplary embodiment of the present invention. FIG. 2 is a view exemplarily illustrating a structure of the active suspension control unit according to an exemplary embodiment of the present invention.

As illustrated in FIG. 1 and FIG. 2, the control unit according to an exemplary embodiment of the present invention largely includes a first controller 100, a second controller 200, and an actuator 300 controlled by both of them.

The control unit of the present invention is disposed to an active roll stabilization (ARS) type suspension for controlling it. The first controller 100 may be a central control unit of a vehicle, for example, an electronic control unit (ECU). The first controller 100 receives information from various sensors mounted to the vehicle and generates control signals. For example, a vehicle state estimation module may estimate a relative suspension vertical velocity and transmit it to the first controller 100, and the first controller 100 may transmit a control signal to the actuator 300 based on the estimated relative suspension vertical velocity.

In the instant case, the vehicle state estimation module may estimate the relative suspension vertical velocity by integrating, for example, the body vertical acceleration and the wheel vertical acceleration measured from the acceleration sensors disposed on a vehicle body and a wheel, respectively.

Although the actuator 300 is set as hardware including a motor, a decelerator, and a bushing in the following description of the present invention, the present invention is not limited thereto. For example, the actuator 300 may also be a hydraulic device or a motor-worm gear structure.

The first controller 100 determines a desired relative suspension vertical force value from a preset database after checking whether the vehicle is driving straight ahead or turning, whether the road condition are flat or rough, and how fast the vehicle speed is. The determined desired relative suspension vertical force value is utilized in the second controller 200 to be described later.

When the actuator 300 is controlled only by the first controller 100, the actuator 300 operates to change the behavior of the vehicle after determining the signal generated by the behavior of the vehicle and transmitting the control signal. Hence, a delay occurs in the cycle in which the behavior signal of the changed vehicle is determined again and the control signal of the actuator 300 is changed and transmitted. Accordingly, the second controller 200 should be applied to minimize the delay by a more immediate response.

The second controller 200 determines a desired control value of the actuator 300 based on the desired vertical force value and the difference value $V_R - V_L$.

The second controller 200 determines a final desired control value of the actuator 300 based on the desired relative suspension vertical force value received from the first controller 100 and the difference value, which is a relative suspension vertical velocity difference between left and right wheels determined by the vehicle state estimation module. In the instant case, the final desired control value is determined by summing a first desired control value determined through the desired relative suspension vertical force value and a second desired control value determined through the difference value $V_R - V_L$.

The second controller 200 receives the desired relative suspension vertical force value of the right wheel of the vehicle from the first controller 100 and determines the first desired control value of the actuator 300 for the right wheel using the following Equation 1, or Equation 1-A:

$$\tau_{Gc} = G_c F_{R,d}, \quad \text{Equation 1:}$$

$$\tau_{Gc} = G_c F_{L,d}, \quad \text{Equation 1-A:}$$

where $\tau_{Gc}$ is a second controller's first desired control value, $G_c$ is a second controller's feedback control function, $F_{R,d}$ is a right wheel's desired relative suspension vertical force value, and $F_{L,d}$ is a left wheel's desired relative suspension vertical force value. In the instant case, $G_c$ is defined by Equation 1-1, and $F_{R,d}$ is received as a fixed value from the first controller 100.

$$G_c = Y_1/S, \quad \text{Equation 1-1:}$$

where $Y_1$ is a second controller's open loop control function, and S is a sensitivity function defined by Equations 1-2 to 1-4.

$$S = 1 - T, \quad \text{Equation 1-2:}$$

$$T = 1/(\tau s + 1)2, \text{ and} \quad \text{Equation 1-3:}$$

$$\tau = 1/2\pi f, \quad \text{Equation 1-4:}$$

where T is a desired transfer function, $\tau$ is a time constant, s is a Laplace operator, and f is a cut-off frequency.

In the instant case, T may also be expressed as $Y_1 H4$. H4 is one of ARS actuator hardware's transfer functions, and the ARS actuator hardware's transfer functions are as follows:

$$H1 = F_L/\tau_{motor};$$

$$H2 = F_L/V_L;$$

$$H3 = F_L/V_R;$$

$$H4 = F_R/\tau_{motor};$$

$$H5 = F_R/V_L; \text{ and}$$

$$H6 = F_R/V_R,$$

where $F_L$ is a left wheel's relative suspension vertical force, $F_R$ is a right wheel's relative suspension vertical force, $V_L$ is a left wheel's relative suspension vertical velocity, $V_R$ is a right wheel's relative suspension vertical velocity, and $\tau_{motor}$ is an actuator's final desired control value ($\tau_{Gc} + \tau_{Y2}$). In the instant case, $\tau_{Y2}$ will be described later.

As a result, the right wheel's relative suspension vertical force and the final desired control value determined by the second controller 200 are as follows:

$$F_R = H4\tau_{motor} + H5V_L + H6V_R; \text{ and}$$

$$\tau_{motor} = H4^{-1}(F_R - H5V_L - H6V_R).$$

Although the first desired control value is referred to as being determined based on the right wheel's desired relative suspension vertical force value as described above, the present invention is not limited thereto. For example, the first desired control value may also be determined based on the left wheel's desired relative suspension vertical force value.

In the instant case, $F_L$ may be determined by substituting Equation H4 with Equation H1, substituting Equation H5 with Equation H2, and substituting Equation H6 with Equation H3 as follows. $F_L = H1\tau_{motor} + H2V_L + H3V_R$ Meanwhile, the second controller 200 may receive the right wheel's relative suspension vertical velocity and the left wheel's relative suspension vertical velocity from a vertical velocity estimation module. In the instant case, the vertical velocity estimation module may estimate the relative suspension vertical velocity by integrating the accelerations measured from the body acceleration sensor and the wheel acceleration sensor.

The second controller 200 receives the right wheel's relative suspension vertical velocity and the left wheel's relative suspension vertical velocity to determine a difference value $V_R - V_L$, which is the difference therebetween, and determines the second desired control value of the actuator 300 using the following Equation 2:

$$\tau_{Y2}=Y_2(V_R-V_L),\qquad\text{Equation 2:}$$

where $\tau_{Y2}$ is a second controller's second desired control value, $Y_2$ is a second controller's control function, $V_R$ is a right wheel's relative suspension vertical velocity, and $V_L$ is a left wheel's relative suspension vertical velocity. Furthermore, $Y_2$ is determined by the following Equation 2-1, and $V_R$ and $V_L$ are determined by the following Equations 2-2 and 2-3:

$$Y_2=-H4^{-1}H6/(\tau s+1)2;\qquad\text{Equation 2-1:}$$

$$V_R=V_{us,R}-V_{s,R};\text{ and}\qquad\text{Equation 2-2:}$$

$$V_L=V_{us,L}-V_{s,L},\qquad\text{Equation 2-3:}$$

where $V_{us,R}$ is a right wheel's unsprung mass vertical velocity, $V_{s,R}$ is a right wheel's sprung mass vertical velocity, $V_{us,L}$ is a left wheel's unsprung mass vertical velocity, and $V_{s,L}$ is a left wheel's sprung mass vertical velocity.

That is, the relative suspension vertical velocity is determined as a difference between the unsprung mass (e.g., wheel) vertical velocity and the sprung mass (e.g., vehicle body) vertical velocity, and the difference value is determined as a difference between the relative suspension vertical velocities of the left and right wheels. That is, since the disturbance is caused by a height between the left and right wheels and a difference between ascending and descending speeds, it may be caused, for example, when the vehicle drives on the rough road or passes the raised spot.

In summary, the final output (motor torque) of the actuator 300 is determined by summing the first and second desired control values determined by the second controller 200 as in the following Equation 3:

$$\tau_{motor}=\tau_{Gc}+\tau_{Y2}.\qquad\text{Equation 3}$$

The active suspension control unit configured as described above may be applied to either the front wheel or the rear wheel of the vehicle, or may be applied to both the front wheel and the rear wheel. That is, a front wheel second controller 210 may be disposed to a front wheel actuator 310 and a rear wheel second controller 220 may be disposed to a rear wheel actuator 320.

Meanwhile, the second controller 200 may determine the first and second desired control values using one controller, but it may determine the first and second desired control values using two separate controllers, respectively.

Figure 3:
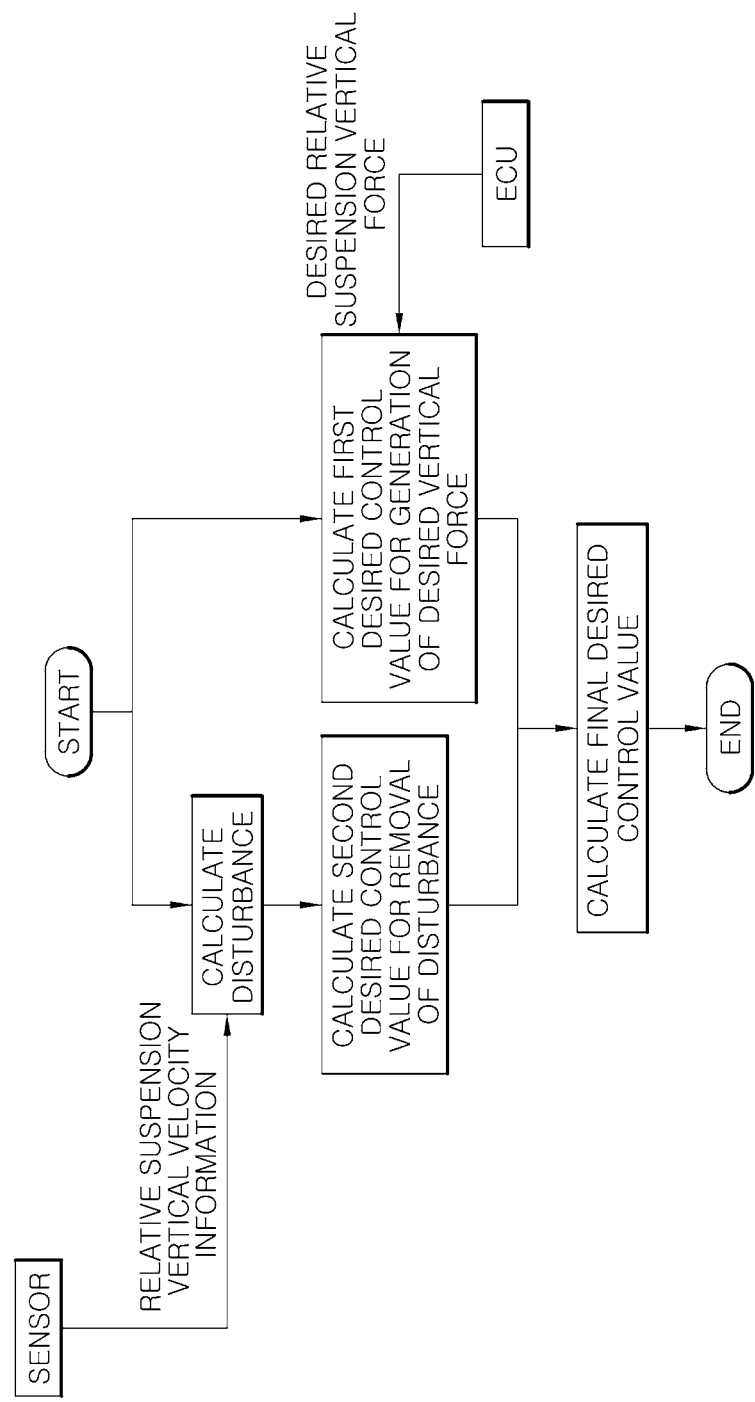
FIG. 3 is a flowchart illustrating an active suspension control method according to an exemplary embodiment of the present invention.
Figure 4:
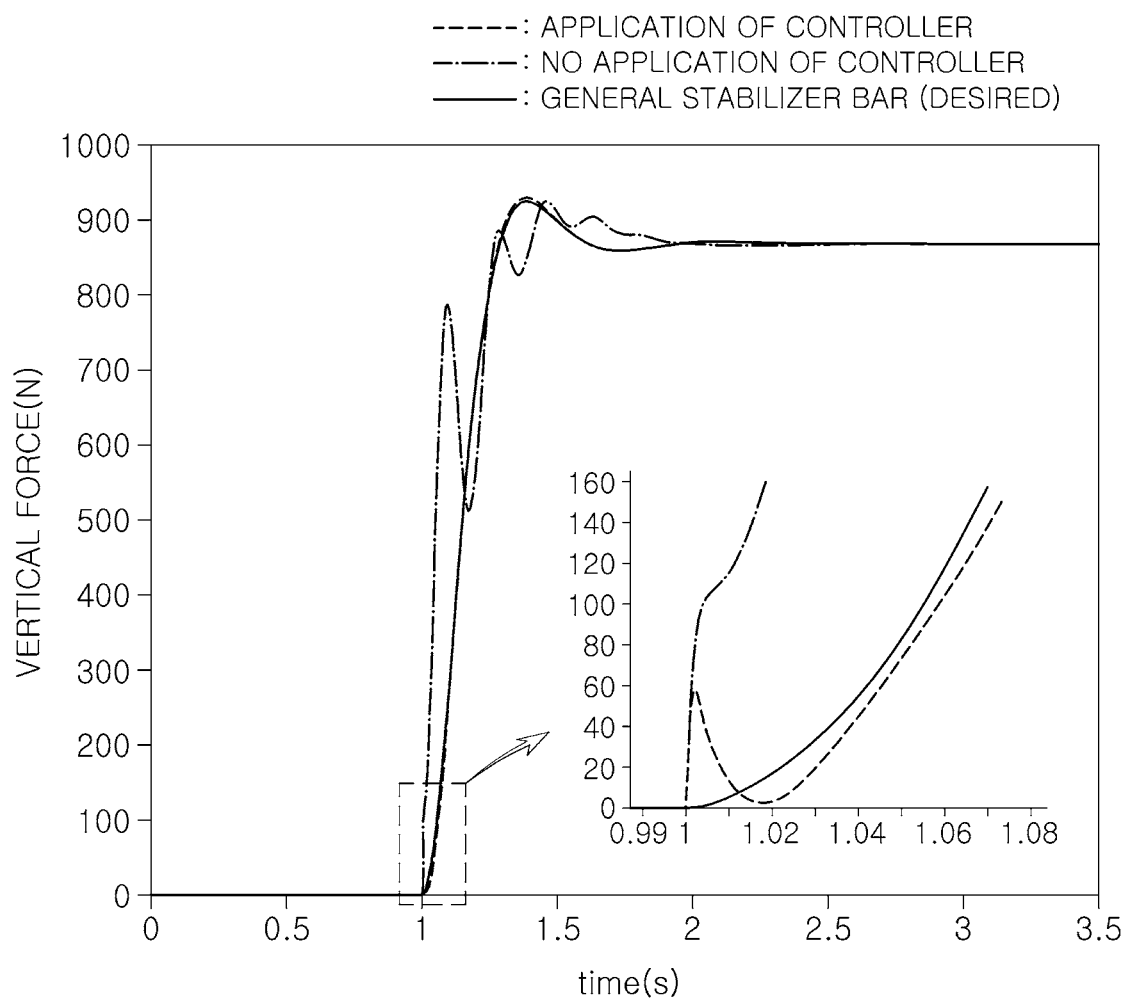
FIG. 4 is a graph illustrating a state in which a perpendicular force flow is reduced when the active suspension control unit and method according to an exemplary embodiment of the present invention are used.

FIG. 3 is a flowchart illustrating an active suspension control method according to an exemplary embodiment of the present invention. FIG. 4 is a graph illustrating a state in which a vertical force flow is reduced when the active suspension control unit and method according to an exemplary embodiment of the present invention are used.

As illustrated in FIGS. 1 to 4, the active suspension control method according to an exemplary embodiment of the present invention includes the steps of determining a desired relative suspension vertical force value according to the driving situation, of determining a difference value by estimating a right wheel's relative suspension vertical velocity and a left wheel's relative suspension vertical velocity, of determining a final desired control value of an actuator by determining a first desired control value of the actuator based on the desired relative suspension vertical force value, determining a second desired control value of the actuator based on a difference value of the relative suspension vertical velocity of the first wheel and the relative suspension vertical velocity of the second wheel, and summing the first and second desired control values of the actuator, and of operating the actuator based on the determined final desired control value of the actuator.

In the step of determining a desired relative suspension vertical force value, a first controller 100 determines the desired relative suspension vertical force values for left and right wheels from a pre-stored profile considering the vehicle speed, the turning angle, the road surface condition, and the like in general.

In the step of determining a difference value, a vehicle state estimation module estimates the relative suspension vertical velocities by integrating relative suspension vertical accelerations, and determines the difference value based on a difference between the left and right wheel's relative suspension vertical velocities.

In the step of determining a final desired control value of an actuator, the final desired control value of the actuator is determined based on the information generated in the step of determining a desired relative suspension vertical force value and the information generated in the step of determining a difference value $V_R-V_L$.

The final desired control value of the actuator 300 is determined by determining the first desired control value of the actuator 300 corresponding to the desired relative suspension vertical force value transmitted from the first controller 100 and the second desired control value of the actuator 300 corresponding to the difference value transmitted from the vehicle state estimation module in a second controller 200, and summing the first and second desired control values.

If there is no second controller 200, a control delay of about 0.2 seconds occurs due to the delay time caused by the inertia and the damping elements. When the present delay is recognized by a passenger, the passenger experiences inconvenience such as shaking or vibration. Therefore, the method of excessively increasing the output of the actuator during the initial response or adding a separate control strategy has been used in the related art.

As illustrated in FIG. 4, when the second controller 200 is not used, it exhibits a difference from the desired response of the conventional stabilizer bar due to the hardware characteristics of the actuator 300, which may cause not only a sense of difference but also excessive vibration in passengers.

Accordingly, the present invention controls the output of the actuator 300 to exhibit response similar to the conventional stabilizer bar while minimizing the delay through the second controller 200. Consequently, it is possible to improve the comfort of passengers and exhibit stable driving performance even when the vehicle drives on the rough road or passes the raised spot.

In the step of operating the actuator, the shaking or vibration transmitted to the internal space of the vehicle is minimized by applying the above-determined final actuator output to the actuator 300 and operating the actuator 300.

Furthermore, the detailed control method in the steps of determining a difference value and determining a final desired control value of an actuator are replaced with the description of the above active suspension control unit.

Although the exemplary embodiments of the present invention have been included for illustrative purposes, it will be understood by those skilled in the art that various modifications may be made without departing from the spirit and scope or essential features of the disclosure.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An active suspension control unit comprising:
   an actuator having an active roll stabilization (ARS) structure to variably adjust response characteristics of a suspension; and
   a controller connected to a sensor and configured for determining a driving situation of a vehicle through information input from the sensor, and determining a final target control value of the actuator based on a target relative suspension vertical force value set in advance according to the driving situation and a difference value generated by a difference between relative suspension vertical velocities of first and second wheels,
   wherein the controller includes:
      a first controller configured for outputting the target relative suspension vertical force value; and
      a second controller configured for determining the final target control value by summing a first target control value determined based on the target relative suspension vertical force value transmitted from the first controller and a second target control value determined based on the difference value.

2. The active suspension control unit according to claim 1,
   wherein the second controller is configured to receive the target relative suspension vertical force value of one of the first and second wheels from the first controller and is configured to determine the first target control value of the second controller using the following Equation 1 or Equation 1-A:

$$\tau_{Gc}=G_c F_{R,d},\qquad\text{Equation 1:}$$

$$\tau_{Gc}=G_c F_{L,d},\qquad\text{Equation 1-A:}$$

where $\tau_{Gc}$ is the first target control value of the second controller, $G_c$ is a control function of the second controller, $F_{R,d}$ is a target relative suspension vertical force value of the first wheel, and $F_{L,d}$ is a target relative suspension vertical force value of the second wheel.

3. The active suspension control unit according to claim 1, wherein the second controller is configured to receive the relative suspension vertical velocity of the first wheel and the relative suspension vertical velocity of the second wheel to determine the difference value of the relative suspension vertical velocity of the first wheel and the relative suspension vertical velocity of the second wheel, and is configured to determine the second target control value of the second controller using the following Equation 2:

$$\tau_{Y2}=Y_2(V_R-V_L),\qquad\text{Equation 2:}$$

where $\tau_{Y2}$ is a second target control value of the second controller, $Y_2$ is a control function of the second controller, $V_R$ is the relative suspension vertical velocity of the first wheel, and $V_L$ is the relative suspension vertical velocity of the second wheel.

4. The active suspension control unit according to claim 3,
   wherein the second controller is configured to receive the relative suspension vertical velocity of the first wheel and the relative suspension vertical velocity of the second wheel from a vertical velocity estimation module.

5. The active suspension control unit according to claim 4,
   wherein the sensor includes a body acceleration sensor and a wheel acceleration sensor, and
   wherein the vertical velocity estimation module estimates the relative suspension vertical velocities based on a difference between accelerations measured by the body acceleration sensor and the wheel acceleration sensor.

6. The active suspension control unit according to claim 1,
   wherein the second controller is configured to determine the final target control value by summing the first target control value of the second controller determined based on the target relative suspension vertical force value and the second target control value of the second controller determined based on the difference value.

7. An active suspension control method comprising:
   determining a target relative suspension vertical force value according to a driving situation of a vehicle;
   determining a difference value by estimating a relative suspension vertical velocity of a first wheel and a relative suspension vertical velocity of a second wheel;
   determining a final target control value of an actuator by determining a first target control value of the actuator based on the target relative suspension vertical force value, determining a second target control value of the actuator based on the difference value of the relative suspension vertical velocity of the first wheel and the relative suspension vertical velocity of the second wheel, and summing the first and second target control values; and
   operating the actuator based on the determined final target control value of the actuator.

8. The active suspension control method according to claim 7,
   wherein a first controller is configured for outputting the target relative suspension vertical force value.

9. The active suspension control method according to claim 7,
   wherein in the determining a final target control value of an actuator, the first target control value of a second controller is determined from the target relative suspension vertical force value using the following Equation 1, and the second target control value of the second controller is determined from the difference value using the following Equation 2:

$$\tau_{Gc}=G_c F_{R,d},\qquad\text{Equation 1:}$$

$$\tau_{Y2}=Y_2(V_R-V_L),\qquad\text{Equation 2:}$$

where $\tau_{Gc}$ is the first target control value of the second controller, $G_c$ is a control function of the second controller, $F_{R,d}$ is a target relative suspension vertical force value of the first wheel, $\tau_{Y2}$ is a second target control value of the second controller, $Y_2$ is a control function of the second controller, $V_R$ is the relative suspension vertical velocity of the first wheel, and $V_L$ is the relative suspension vertical velocity of the second wheel.

10. The active suspension control method according to claim 7,
    wherein in the determining a target relative suspension vertical force value, the target relative suspension vertical force value set in advance according to the driving situation is output.

11. The active suspension control method according to claim 7,
    wherein in the determining a difference value, the difference value is output by determining a difference between the relative suspension vertical velocity of the first wheel and the relative suspension vertical velocity of the second wheel.

12. The active suspension control method according to claim 11,
    wherein in the determining a difference value, the relative suspension vertical velocity of the first wheel and the relative suspension vertical velocity of the second wheel are estimated using a difference between acceleration of a vehicle body and accelerations of the first and second wheels.

* * * * *